United States Patent Office 3,634,284
Patented Jan. 11, 1972

3,634,284
EMULSIFICATION OF HYDROCARBONS IN AQUEOUS ELECTROLYTE SOLUTIONS
Albert Benson, Fairlawn, and Gerhart Karg, Pompton Lakes, N.J., assignors to Witco Chemical Corporation, New York, N.Y.
No Drawing. Filed Jan. 24, 1968, Ser. No. 700,002
Int. Cl. B01j 13/00
U.S. Cl. 252—312                                                    10 Claims

ABSTRACT OF THE DISCLOSURE

Emulsions of certain normally liquid hydrocarbons in aqueous solutions of electrolytes such as sea water having improved long term stability and containing from 10–25% by weight, based on the amount of said hydrocarbon, of oleic diethanolamide.

---

This invention relates to novel stable oil-in-water emulsions wherein the aqueous phase contains from about 1% up to about 5%, by weight, of water-soluble inorganic metal salts as particularly exemplified by sea water.

There are numerous situations in which it is desired to have available stable dispersions of certain types of normally liquid petroleum hydrocarbons in aqueous solutions containing of the order of about 1 or 2% up to about 5% of water-soluble inorganic salts or electrolytes. Sea water is a typical example of such aqueous solutions of water-soluble inorganic salts or electrolytes which it is highly convenient and economical to use for the cleaning of petroleum storage facilities. The cleaning of such and other types of facilities and surfaces is advantageously accomplished by means of emulsions containing a continuous phase comprising, for instance, sea water, and a dispersed phase comprising certain normally liquid petroleum hydrocarbons. The production of emulsions of such types which have adequate stability and which are efficacious for such and related cleaning operations has presented certain substantial problems.

Numerous emulsifiers and combinations of emulsifiers are, of course, known to the art which are useful for and which have been used to produce stable emulsions of certain ingredients for certain uses. It is well known, however, that numerous emulsifiers which are suitable for preparing various oil-in-water emulsions lose their effectiveness when significant quantities of water-soluble salts or electrolytes are present in the aqueous phase. Indeed, it is a generally standard technique to break emulsions by adding a water-soluble salt to such emulsions.

In accordance with the present invention, it has been discovered that oil-in-water emulsions of high stability comprising certain primarily paraffinic and/or cycloparaffinic hydrocarbons practically free of aromatic constituents as the dispersed phase, and water containing dissolved therein from about 1 or 2% up to about 5%, by weight, of water-soluble salts or electrolytes as the continuous phase, can readily be prepared using oleic diethanolamide as the emulsifier. Generally, about 10–25% by weight of said emulsifier, based upon the weight of the aforesaid hydrocarbons, should be used to produce an excellent emulsion of long term stability. The paraffinic and cycloparaffinic hydrocarbons which are used for the purposes of this invention have a viscosity not substantially in excess of 50 S.U.S. at 100° F.

The oleic diethanolamide emulsifier useful in preparing the emulsions of the present invention can be prepared by any of numerous procedures which are well known to the art. Thus, for example, it may conveniently be prepared by reacting methyl oleate and diethanolamine (in a mole ratio of about 1:1 of the oleic acid content of the methyl oleate to the diethanolamine) at elevated temperatures in the presence of a sodium methylate catalyst. It may also be prepared by condensing oleic acid with diethanolamine in a 1 to 2 molar ratio, this technique being less preferable because relatively less oleic diethanolamide is formed. Generally speaking, the by-products formed in these reactions do not interfere with the emulsifying ability of the oleic diethanolamide. A third illustrative procedure of producing the oleic diethanolamide is to oxyethylate the amide of oleic acid.

The emulsifiable oil phase of the emulsions of the present invention, as indicated above, comprises hydrocarbons having a viscosity not substantially in excess of 50 Saybolt Universal seconds (S.U.S.) at 100° F. and are mainly paraffinic or cycloparaffinic. Petroleum hydrocarbons such as Nos. 1 and 2 distillate fuel oils, kerosene, diesel oils of lower viscosity, petroleum aliphatic solvents such as Varsol, and similar relatively lighter fractions are examples of the hydrocarbons which form emulsions of long term stability in sea water or similar aqueous solutions of water-soluble salts in accordance with our invention. For optimum results, i.e. compositions which readily emulsify with a minimum of agitation and which retain homogeneity and stability over an extended period of time, only minor amounts of aromatic compounds need be present in the emulsifiable normally liquid hydrocarbon.

The aqueous phase of the emulsions of the present invention, as stated above, contains from about 1 or 2% up to about 5% water-soluble electrolytes. As used herein, the term water-soluble electrolyte means, generally, the inorganic metal salts. The varied number compounds present in sea water represent the fairly broad nature of electrolytes tolerable in the aqueous phase. Examples of these compounds are sodium chloride, magnesium chloride, magnesium sulfate, magnesium bromide, calcium sulfate, potassium sulfate, and soluble compounds of iron, aluminum and boron. As stated, the concentration of these electrolytes should not exceed about 5% by weight of the aqueous phase.

The emulsions of the present invention are preferably prepared by first combining the oleic diethanolamide with the normally liquid hydrocarbon, such as kerosene, and then adding the aqueous phase. Simple agitation results in complete emulsification. It is important, however, that the oleic diethanolamide be intermixed thoroughly with the normally liquid hydrocarbon, and preferably essentially completely dissolved, as is the case, for instance, with kerosene, prior to addition of the aqueous phase.

With respect to the relative proportions of the oil phase and the aqueous phase in the emulsions of the present invention, it is particularly advantageous that the aqueous phase constitute, by weight, a distinctly larger proportion than the oil phase. Thus, by way of illustration, the aqueous phase particularly advantageously comprises of the order of 70 to 80% or more and the oil phase 30 to 20% or less in relation to each other. As a general rule, it is desirable that the aqueous phase constitute about 80% and the oil phase about 20% relative to each other. However, stable oil-in-water emulsions can be made pursuant to the present invention in which the aqueous phase and the oil phase are present, by weight, in approximately the same proportions to each other.

As indicated above, the quantity of oleic diethanolamide utilized falls within the range of 10–25% or somewhat more, based upon the weight of the normally liquid hydrocarbon in the emulsion. It is preferred, however, to use greater quantities than 10% to obtain optimum emulsion stability over prolonged periods of time, and, to this end, upwards of 12% and, more desirably, 15–25% should be used.

The invention is illustrated, but not limited as to its scope, by the following examples:

EXAMPLE I

Component A:
2 wt. parts oleic diethanolamide
8 wt. parts kerosene

Component B:
40 wt. parts sea water

Component A was prepared by first dissolving the oleic diethanolamide in the kerosene. Then, Components A and B were mixed together, complete emulsification occurring within a few minutes. After 24 hours, less than 1% by volume of the total emulsion had separated; and, after 48 hours, the degree of separation was less than 1½%, with no creaming or other instability evident.

EXAMPLE II

Following the procedure outlined in Example I, emulsions of equivalent stability were prepared utilizing the following materials, the listed percentages being by weight:

(a) 4% oleic diethanolamide, 80% sea water and 16% No. 2 fuel oil
(b) 4% oleic diethanolamide, 80% sea water and 16% diesel oil
(c) 4% oleic diethanolamide, 80% of a 3% NaCl solution and 16% kerosene The foregoing emulsions of Examples I and II are useful in cleaning oil tankers during the pumping procedures.

EXAMPLE III

To demonstrate the comparative selectivity of the oleic diethanolamide in producing the emulsions of the present invention, the following formulations were prepared and failed to produce a stable emulsion.

(a) 4% coconut oil fatty acid diethanolamides, 80% sea water and 16% kerosene
(b) 4% sodium alkyl ($C_7$–$C_9$) benzene sulfonate, 80% sea water and 16% kerosene It may be pointed out that no claim is made broadly to the use of oleic diethanolamide as an emulsifier or as an emulsifier for the production of aqueous-oleaginous emulsions. It has long been known that condensation products of alkanolamines and higher fatty acids, including alkanolamides and diethanol amides of higher fatty acids, including oleic acid, are useful as emulsifiers, as disclosed, for instance, in U.S. Reissue Pat. No. 21,530 and U.S. Pat. No. 2,089,212. In U.S. Pat. No. 2,531,190, emulsifying compositions are disclosed comprising dialkylolamides, including oleic diethanolamide, in admixture with greatly predominating proportions of higher fatty acid mono-esters of glycols for use in the preparation of stable emulsions of organic substances in hard water or in sea water. In U.S. Pat. No. 2,794,000, oil-in-water emulsions are disclosed in which the emulsifier is a condensation product of oleic acid, diethanolamine and ethylenediamine tetraacetic acid, the latter being an essential ingredient which enters into the structure of the emulsifier condensation product. In U.S. Pat. No. 3,175,949, mineral oil-in-water emulsions are disclosed containing at least 10% each of water and mineral oil and in which the emulsifier, which is linoleic diethanol amide, is used in amounts equal to from about 0.5 to 0.75 times the amount of mineral oil present. In no case, however, of which we are aware, has there been any prior disclosure or teaching of the production of stable oil-in-water emulsion in which the oil phase contains primarily paraffinic and cycloparaffinic petroleum hydrocarbons having a viscosity not substantially in excess of 50 S.U.S. at 100° F., in which the aqueous phase is sea water or water containing from about 1 to 5% of water-soluble electrolyte, and in which the emulsifier, constituting from 10 to 25%, by weight of said oil phase, is simply an oleic diethanolamide.

What is claimed is:

1. A stable emulsion consisting essentially of (a) an aqueous continuous phase containing from about 1 to 5%, by weight, of water-soluble inorganic metal salt electrolyte, (b) up to 50%, by weight, of an oil dispersed phase containing primarily paraffinic or cycloparaffinic petroleum hydrocarbons having a viscosity not substantially in excess of 50 S.U.S. at 100° F., and (c) from about 10 to 25%, by weight, of the oil phase of an oleic diethanolamide as essentially the sole emulsifier.

2. An emulsion according to claim 1, wherein the aqueous phase is sea water.

3. An emulsion according to claim 2, wherein the oil phase contains from 15–25%, by weight, of oleic diethanolamide, based upon the weight of the oil phase.

4. An emulsion according to claim 1, consisting essentially of from about 10% to 50% by weight oil phase and from about 90% to about 50% by weight aqueous phase, said oil phase containing from about 10 to 25%, by weight, based on the quantity of oil phase, of an oleic diethanolamide as the emulsifier.

5. An emulsion according to claim 2, consisting essentially of from about 70 to 80% by weight oil phase and from about 30 to 20% by weight aqueous phase, said oil phase containing from about 15 to 25%, by weight, based on the quantity of oil phase, of an oleic diethanolamide as the emulsifier.

6. An emulsion according to claim 5, wherein the oil phase is kerosene.

7. The method of preparing the stable emulsion of claim 1 which comprises dissolving in said hydrocarbons from about 10 to 25%, by weight thereof, of an oleic diethanolamide as the emulsifier, said hydrocarbons being primarily paraffinic or cycloparaffinic and having a viscosity not substantially in excess of 50 S.U.S. at 100° F., and then admixing the resulting solution with said water-containing electrolyte under conditions of simple agitation whereby to form said stable emulsion.

8. The method of claim 7, in which the water-containing electrolye is sea water.

9. The method of claim 8, in which the oleic diethanolamide constitutes from about 15–25%, by weight, of said hydrocarbons.

10. The method of claim 9, in which the hydrocarbons constitute from about 10 to 50% and the sea water constitutes from about 90 to 50% by weight, in relation to each other, of the emulsion.

References Cited

UNITED STATES PATENTS

| | | | |
|---|---|---|---|
| 2,531,190 | 11/1950 | Ackelsburg | 252—356 X |
| 2,818,386 | 12/1957 | Francis et al. | 252—33.2 |
| 2,935,432 | 5/1960 | Schuster et al. | 252—312 UX |
| 2,951,041 | 8/1960 | Saunders | 252—392 |
| 2,974,000 | 3/1961 | Retzsch | 8—94.23 |
| 3,101,301 | 8/1963 | Siegal | 252—312 |
| 3,419,494 | 12/1968 | Teeter et al. | 252—312 |

JOHN D. WELSH, Primary Examiner

U.S. Cl. X.R.

252—357